United States Patent
Yamashita et al.

(10) Patent No.: US 6,231,995 B1
(45) Date of Patent: May 15, 2001

(54) ALUMINUM EXTRUDED DOOR BEAM MATERIAL

(75) Inventors: Hiroyuki Yamashita; Masakazu Hirano, both of Shimonoseki (JP)

(73) Assignee: Kabushiki Kaisha Kobe Seiko Sho, Kobe (JP)

( * ) Notice: Subject to any disclaimer, the term of this patent is extended or adjusted under 35 U.S.C. 154(b) by 0 days.

(21) Appl. No.: 09/092,024

(22) Filed: Jun. 5, 1998

(30) Foreign Application Priority Data

Jun. 7, 1997 (JP) .................................................... 9-164995
Jul. 2, 1997 (JP) .................................................... 9-193225

(51) Int. Cl.⁷ ................................................. B21D 28/00
(52) U.S. Cl. .......................... 428/598; 428/599; 148/439; 148/440; 420/541; 420/543
(58) Field of Search .............................. 52/729.1, 735.1; 428/599, 598, 586, 595, 687; 296/202, 189, 187, 146.6, 146.5; 280/144, 541; 420/542, 543, 552; 148/439, 440

(56) References Cited

U.S. PATENT DOCUMENTS

| 4,599,843 | * | 7/1986 | Ingvarsson . |
| 5,066,342 | * | 11/1991 | Rioja et al. . |

FOREIGN PATENT DOCUMENTS

| 3606024 | * | 8/1987 | (DE) . |
| 56-125597 | | 9/1981 | (JP) . |
| 5-171328 | | 7/1993 | (JP) . |
| 5-246242 | | 9/1993 | (JP) . |
| 5-247575 | | 9/1993 | (JP) . |
| 5-311309 | * | 11/1993 | (JP) . |
| 6-212338 | * | 8/1994 | (JP) . |
| 7-164880 | | 6/1995 | (JP) . |
| 8-170139 | * | 7/1996 | (JP) . |
| 9-241785 | | 9/1997 | (JP) . |

OTHER PUBLICATIONS

Translation, JP 08–170139, Oka et al.*

* cited by examiner

*Primary Examiner*—Deborah Jones
*Assistant Examiner*—Wendy Boss
(74) *Attorney, Agent, or Firm*—Oblon, Spivak, McClelland, Maier & Neustadt, P.C.

(57) ABSTRACT

An aluminum extruded door beam includes an outer flange, an inner flange, and at least one web for connecting the outer flange and the inner flange. The outer corners at the extended ends of the outer flange have a radius R of 2.5 mm or less. The outward corners at the connections between the web and the inner flange and between the web and the outer flange have a radius R of 2 mm to 4 mm. The radius of the outward corners at the connections between the web and the inner flange and between the web and the outer flange is 1.5 to 2 times the width of the web. The length of the extended ends of the outer flange is 1 to 2 times the radius R of the outward corner at the connections between the web and the outer and inner flanges. The aluminum alloy extruded door beam material contains 0.8 to 1.5% by weight (hereinafter the same) of Mg and 4 to 7% of Zn, and the recrystallization surface layer has a thickness of 50 μm or less.

30 Claims, 8 Drawing Sheets

P : LOAD
δ : DISPLACEMENT

ALUMINUM EXTRUDED DOOR BEAM MATERIAL

BACKGROUND OF THE INVENTION

1. Field of the Invention

The present invention relates to aluminum door beams used in reinforcing members for doors of vehicles, such as automobiles and trucks. The door beam is arranged in a door to absorb the shock from a collision in the side direction and to secure safety of passengers.

2. Description of the Related Art

Recently, the global environment has been regarded as being of worldwide importance. For example, regulations for reducing gas emissions including carbon dioxide from automobiles have been strengthened in many countries in order to suppress global warming. Accordingly, lightweight automobiles have been in rapid development.

A door beam for an automobile is attached to the interior of a door in order to absorb the shock from a collision. A typical conventional material used is steel, for example, high-tensile steel of 150 kgf/mm² grade. In recent years, however, the use of aluminum extrusions has been investigated in view of achievement of a lightweight automobile.

Door beams for automobiles (also referred to as impact beams, impact bars, guard bars, or door side beams) are required to have high energy absorbability to soften the shock from a collision. For example, Federal Motor Vehicle Safety Standard (FMVSS) defines criteria of the bending strength and absorbed energy to a load applied from the side of a vehicle. At laboratory tests, these bending properties are evaluated by a three-point bending strength test simulating side collision of a vehicle as shown in FIG. 2A, in which a door beam is supported at the two ends and a load is applied to the center.

FIG. 2B is a typical schematic load (P) vs. displacement ($\delta$) curve in the three-point bending test shown in FIG. 2A. FIG. 2B shows that the load reaches a maximum value as the displacement increases, and then it decreases at a further displacement because of overload buckling of the aluminum beam. In general, it is preferred that the maximum load be larger and the displacement when the buckling occurs be larger, that is, the energy absorption be larger, as shown by a solid line in FIG. 3. The energy absorption corresponds to the area represented by hatched lines in the load (P) vs. displacement ($\delta$) curve of FIG. 2B.

Stricter properties have been required for door beams being highly conscious of safety, that is, improvements in maximum load and energy absorption without an increase in the weight have been required. For example, in a three-point bending test under a specified condition for door beams, a current required level of the maximum load is 1,300 kg, which is considerably higher than the conventional level 1,100 kg.

Recently, door beams have been applied to compact cars having short doors. Since the distance (L) between the two ends in FIG. 2A is short, in collision of compact cars, a small displacement ($\delta$) causes a larger bending curvature. Thus, rupture will occur more readily with a small displacement.

SUMMARY OF THE INVENTION

The present inventors have actively investigated a technology for achieving an aluminum door beam without an increase in weight, which has a large maximum load, a large displacement before buckling (hereinafter referred to as buckling displacement), a large displacement without rupture, and a large energy absorption in view of a cross-section and dependence of the surface texture on the composition of the door beam material.

The investigation was performed in view of the following two aspects. First, the rupture of the door beam causes decreased absorption energy, and the ruptured portion is harmful for the passenger. Thus, the rupture must be absolutely avoided. A target of the present invention is to provide a configuration in which buckling proceeds predominantly before the inner flange at the extension side breaks by the limit of stress-strain characteristics.

Second, another possible method to prevent the rupture of the door beam is increased thicknesses of the flange and the web; however, this method caused an increase in weight. Thus, another target of the present invention is to control the composition and the surface texture of the door beam material for simultaneously achieving lightweight and high performance.

As a result, the present inventors have made the following finding. In the cross-section of an aluminum door beam, the radius R of the outer corner at the extended ends of the outer flange (hereinafter referred to as $R_{FO}$) and the radius R of the outward corner at the connections between the web and the outer and inner flanges (hereinafter referred to as $R_{WO}$) significantly affect the buckling displacement and energy absorption in the load (P) vs. displacement ($\delta$) curve. In the dependence of the surface texture on the composition of the door beam material, when the thickness of the recrystallization layer on the outer surface of the door beam is reduced or the layer is eliminated, the stress concentration during bending deformation is prevented and the energy absorption is improved. This is prominent in a door beam having a large maximum load.

The present invention is achieved based on the finding.

Accordingly, it is an object of the present invention to provide an aluminum extruded door beam comprising an outer flange, an inner flange, and at least one web for connecting the outer flange and the inner flange, the outer corners at the extended ends of the outer flange having a radius R of 2.5 mm or less.

It is another object of the present invention to provide an aluminum extruded door beam material comprising an outer flange, an inner flange, and at least one web for connecting the outer flange and the inner flange, the outward corners at the connections between the web and the inner flange and between the web and the outer flange having a radius R of 2 mm to 4 mm.

It is a further object of the present invention to provide an aluminum extruded door beam material comprising an outer flange, an inner flange, and at least one web for connecting the outer flange and the inner flange, the radius of the outward corners at the connections between the web and the inner flange and between the web and the outer flange being 1.5 to 2 times the width of the web.

It is a still further object of the present invention to provide an aluminum extruded door beam material comprising an outer flange, an inner flange, and at least one web for connecting the outer flange and the inner flange, the length of the extended ends of the outer flange being 1 to 2 times the radius R of the outward corner at the connections between the web and the flanges.

It is still another object of the present invention to provide an aluminum alloy extruded door beam material comprising 0.8 to 1.5% by weight (hereinafter the same) of Mg; 4 to 7% of Zn; 0.005 to 0.3% of Ti; at least one element selected from the group consisting of 0.05 to 0.6% of Cu, 0.2 to 0.7% of Mn, 0.05 to 0.3% of Cr, and 0.05 to 0.25% of Zr; and the balance being Al and incidental impurities, the thickness of the recrystallization surface layer being 50 μm or less.

It is a still further object of the present invention to provide an aluminum alloy extruded door beam material comprising 0.8 to 1.5% by weight (hereinafter the same) of Mg and 4 to 7% of Zn, the recrystallization surface layer having a thickness of 50 μm or less.

DESCRIPTION OF THE PREFERRED EMBODIMENTS

An aluminum extruded door beam in accordance with the present invention includes an outer flange, an inner flange, and at least one web for connecting the outer flange and the inner flange. The outer corners at the extended ends of the outer flange have a radius $R_{FO}$ of 2.5 mm or less.

Figure 4:
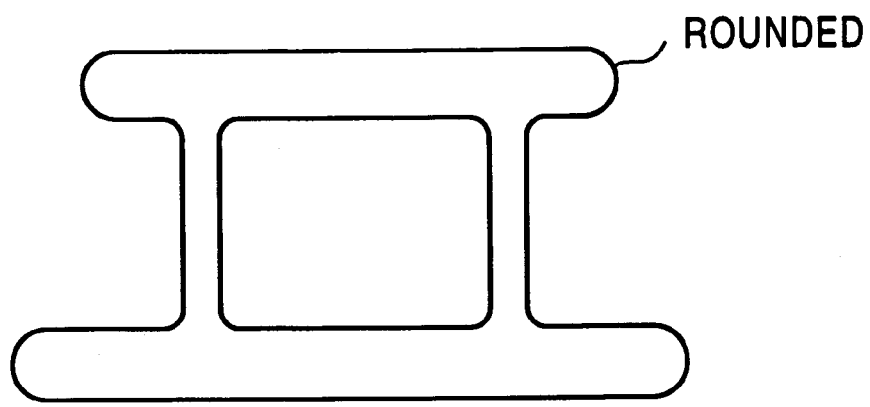
FIG. 4 is a cross-sectional view of a typical conventional aluminum door beam.

The corners of extended ends of the flange of a conventional door beam are rounded as shown in FIG. 4 in view of extrudability, in contrast, the corners in the present invention are angular. According to the finding by the present inventors, the angular corner is resistive to buckling, and thus buckling displacement and energy absorption are improved. That is, the angular corner of the extended end of the flange causes a larger width of the extended end of the flange compared with the rounded corner, hence the angular corner is resistive to buckling. Further, a load is applied to a larger area in the angular corner, hence the load is more dispersed and the angular corner is resistive to buckling. A radius $R_{FO}$ larger than 2.5 mm will not cause such an improvement. A smaller radius $R_{FO}$ causes further improved buckling displacement and energy absorption, therefore, it is preferred that the radius $R_{FO}$ be 2 mm or less, and more preferably 1 mm or less. It is preferable that the radius $R_{FO}$ be 0.5 mm or more in view of extrudability.

An aluminum extruded door beam material in accordance with the present invention includes an outer flange, an inner flange, and at least one web for connecting the outer flange and the inner flange, and the outward corners at the connections between the web and the inner flange and between the web and the outer flange have a radius $R_{WO}$ of 2 mm to 4 mm.

In conventional door beams, the $R_{WO}$ is determined in view of extrudability. The present inventors discovered that the radius $R_{WO}$ significantly affects the buckling displacement and that the buckling displacement is significantly improved when the radius $R_{WO}$ ranges from 2 mm to 4 mm. The buckling at the extended ends of the outer flange is not substantially prevented when the radius $R_{WO}$ is less than 2 mm, and thus the buckling displacement and energy absorption of the door beam are not improved. Even when the radius $R_{WO}$ is larger than 4 mm, the buckling is not further improved and the weight is unintentionally increased.

Thus, it is presumed that when the radius $R_{WO}$ is larger than the desired size the extended end of the flange is protected from the load applied to the extended end. When the radius $R_{WO}$ has an unnecessary large size, the weight is increased whereas the protective effects of the flange does not further increase.

In another embodiment, an aluminum extruded door beam material includes an outer flange, an inner flange, and at least one web for connecting the outer flange and the inner flange, and the radius $R_{WO}$ of the outward corners at the connections between the web and the inner flange and between the web and the outer flange is 1.5 to 2 times the width $t_W$ of the web.

When the radius $R_{WO}$ is 1.5 to two times the width $t_W$ of the web, the buckling displacement and energy absorption are more effectively improved. A radius $R_{WO}$ of less than 1.5 times the width $t_W$ does not cause such an improvement, whereas a radius $R_{WO}$ of larger than 2 times does not cause a further improvement in prevention of buckling but causes an undesired increase in the weight.

In still another embodiment in accordance with the present invention, an aluminum extruded door beam material includes an outer flange, an inner flange, and at least one web for connecting the outer flange and the inner flange, and the length $L_F$ of the extended ends of the outer flange is 1 to 2 times the radius $R_{WO}$ of the outward corner at the connections between the web and the flanges.

A cross-section satisfying both the length $L_F$ and the radius $R_{WO}$ contributes to significant improvement in buckling displacement and energy absorption. When the length $L_F$ is smaller than the radius $R_{WO}$, the buckling displacement is not substantially improved, whereas a length $L_F$ which is 2 times or more the radius $R_{WO}$ does not cause further improvement in the buckling displacement, considering undesirable increase in the weight.

In still another embodiment in accordance with the present invention, an aluminum alloy extruded door beam material comprises 0.8 to 1.5% by weight (hereinafter the same) of Mg and 4 to 7% of Zn, and the recrystallization surface layer has a thickness of 50 μm or less.

It is preferable to control the texture of the door beam material so that a fibrous texture is present below the recrystallization layer. The recrystallization layer may be not present. In such a case, the fibrous texture is present on the surface of the material.

Preferably, the fibrous texture has an aspect ratio of 1:20 or more. A thick recrystallization layer on the surface causes a rough surface in the bending deformation process, and the rough surface functions as a notch causing stress concentration. Thus, the door beam will be rapidly ruptured.

Preferably, a door beam has two or more among the above-mentioned features.

In the present invention, the term "aluminum" means both "aluminum" and "aluminum alloys".

The preferred embodiments of the present invention will now be described with reference to the attached drawings.

7 is a load (P) vs. displacement (δ) curve in the three-point bending test. Table 1 shows the maximum load, buckling displacement, energy absorption, and the unit weight of the door beam.

TABLE 1

| Door Beam | $R_{FO}$ (mm) | Maximum load (kgf/mm²) | Buckling displacement (mm) | Energy absorption (kgf · mm) | Unit weight (kg/m) | Judgement |
|---|---|---|---|---|---|---|
| A (For comparison) | 3.0 | 1,289 (1.00) | 214 (1.00) | 247,805 (1.00) | 1.40 (1.00) | No good |
| B (Example) | 0.5 | 1,278 (0.99) | 250 (1.17) | 272,634 (1.10) | 1.38 (0.99) | Good |

Remarks:
values in parentheses represent the relative values to those of the door beam A (1.00).
$R_{FO}$ represents the curvature radius R of the outer corners at the extended ends of the outer flange.

Figure 1:
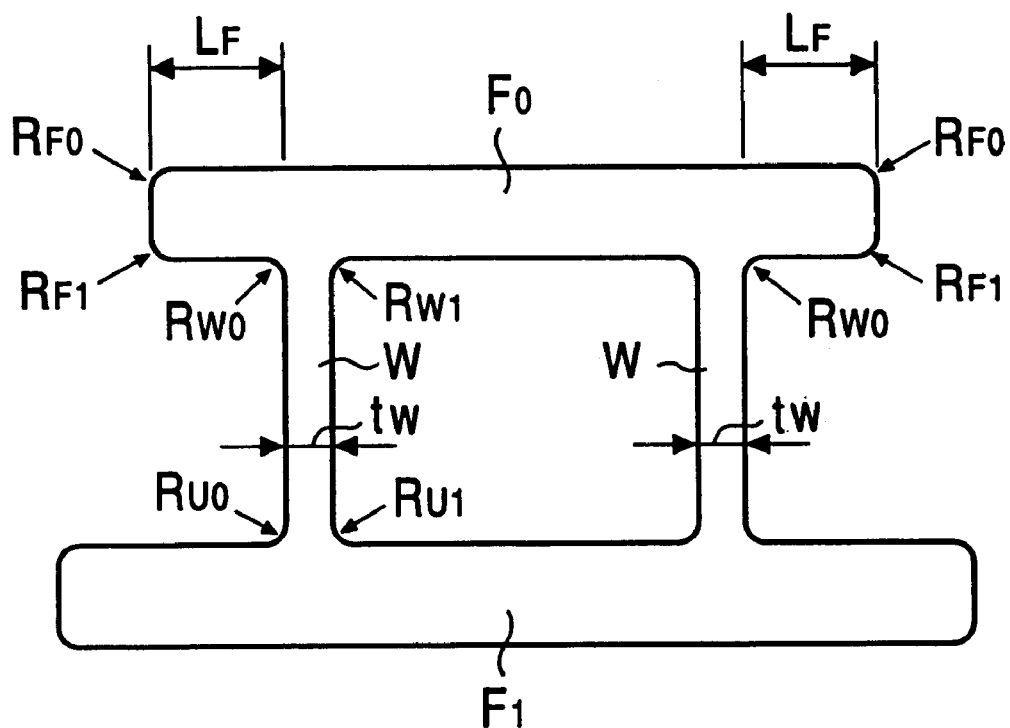
FIG. 1 is a cross-sectional view for illustrating names and reference symbols for main portions of a door beam in accordance with the present invention.

FIG. 1 is a cross-sectional view of a door beam in accordance with the present invention. The door beam includes an inner flange $F_I$, an outer flange $F_O$, and webs W with a width $t_W$, which connect the inner flange $F_I$, and the outer flange $F_O$. The inner flange $F_I$ is arranged toward the inner side of a vehicle when the door beam is assembled onto a door, and the outer flange $F_O$ is arranged toward the outer side of the vehicle. The outer flange $F_O$ has extended ends with a length $L_F$, and the outer corners of the extended ends have a curvature radius of $R_{FO}$. The outward corners of the connections between the outer flange and the webs have a curvature radius of $R_{WO}$.

The shape of the door beam in accordance with the present invention is not limited to that shown in FIG. 1. For example, a door beam having only one web, that is, an I-shaped door beam is included in the scope of the present invention.

Figure 5:
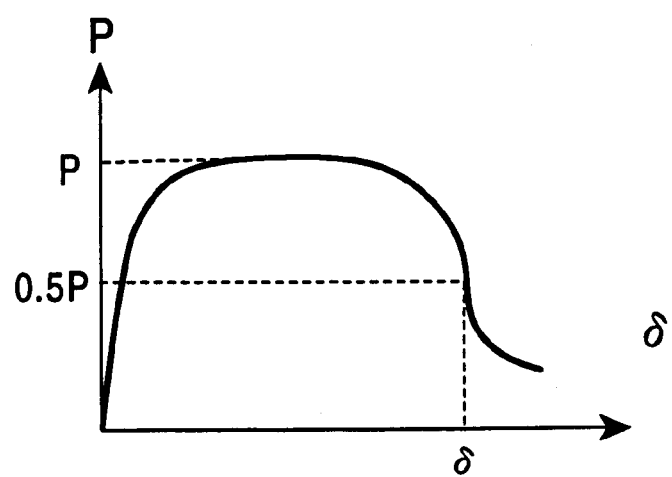
FIG. 5 is a schematic graph for illustrating buckling displacement of a door beam.

The buckling displacement in the present invention is defined as a displacement (δ) when the load becomes half the maximum load (P) in the deformation region after the maximum load is applied, as shown in FIG. 5.

First Embodiment

Figure 6A:
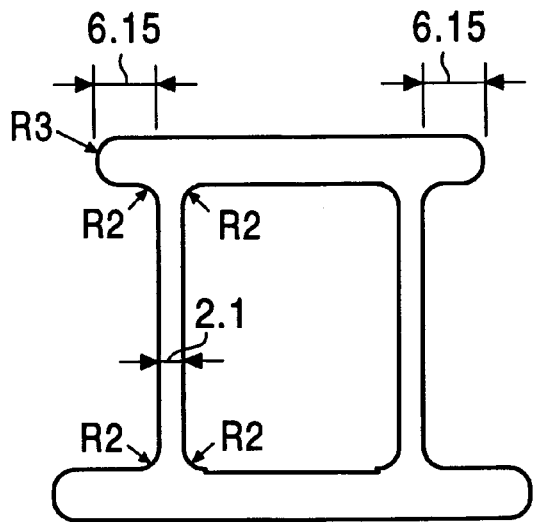
FIGS. 6A and 6B are cross-sectional views of door beams A and B, respectively, in a First Embodiment.
Figure 6B:
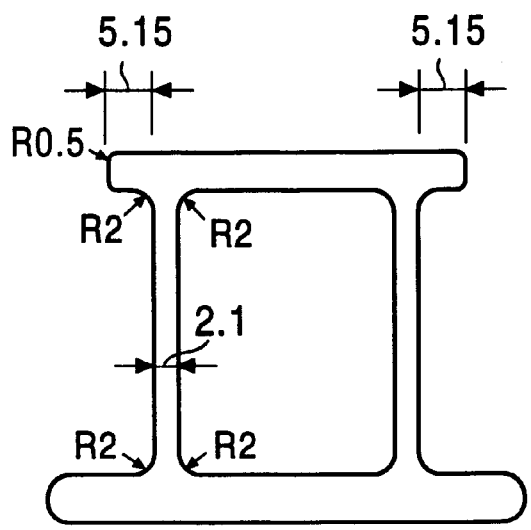

Aluminum door beams A and B having the cross-sectional sizes shown in FIGS. 6A and 6B, respectively, were formed by extrusion of an Al—Mg—Zn alloy composed of 1.4% by weight (hereinafter the same) of Mg, 6.5% of Zn, 0.2% of Cu, 0.15% of Zr, 0.02% of Ti, and 0.3% of Cr, as follows. The alloy was melted by a conventional process and cast to form an ingot with a diameter of 200 mm. The ingot was subjected to homogenizing heat treatment at 470° C. for 8 hours and then extrusion at a temperature of 470° C. and an extrusion rate of 4 m/min to form the door beams A and B. The extruded door beams A and B were subjected to artificial aging at 130° C. for 12 hours. The outer flange of the door beam A has a length of 38 mm and a width of 4.4 mm, the inner flange has a length of 48 mm and a width of 4.6 mm, and the web has a length of 28 mm and a width of 2.1 mm. In the door beam A, the length $L_F$ of the extended ends of the outer flange $F_O$ and the curvature radius $R_{FO}$ of the outer corners of the extended ends are different from those of door beam B, and other portions have the same size.

Figure 2A:
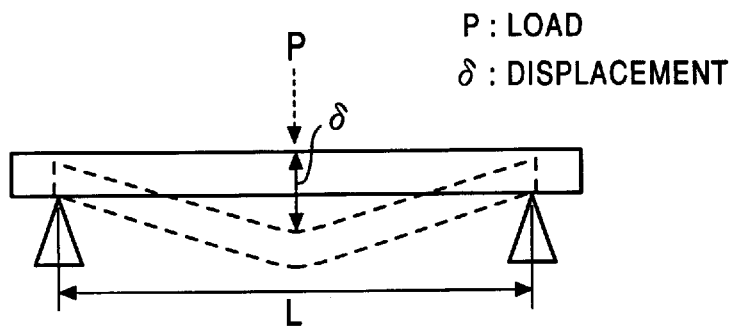
FIG. 2A is a schematic cross-sectional view of a three-point bending test for a door beam.
Figure 2B:
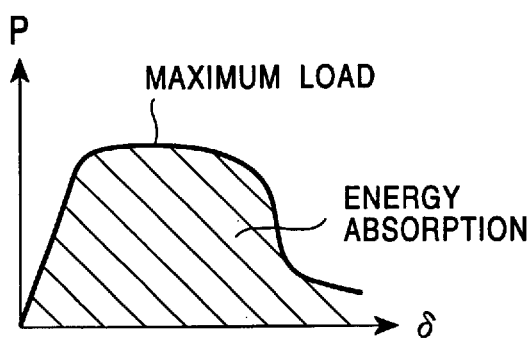
FIG. 2B is a schematic graph of a load (P) vs. displacement (δ) curve in the three-point bending test.
Figure 3:
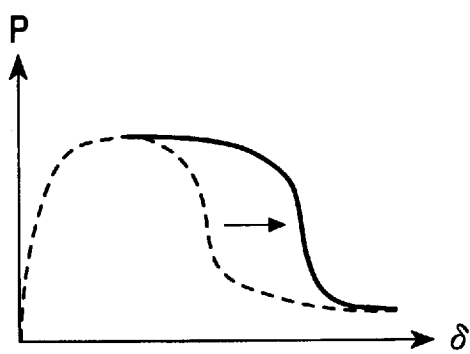
FIG. 3 is a schematic graph of a load (P) vs. displacement (δ) curve in the three-point bending test.
Figure 7:
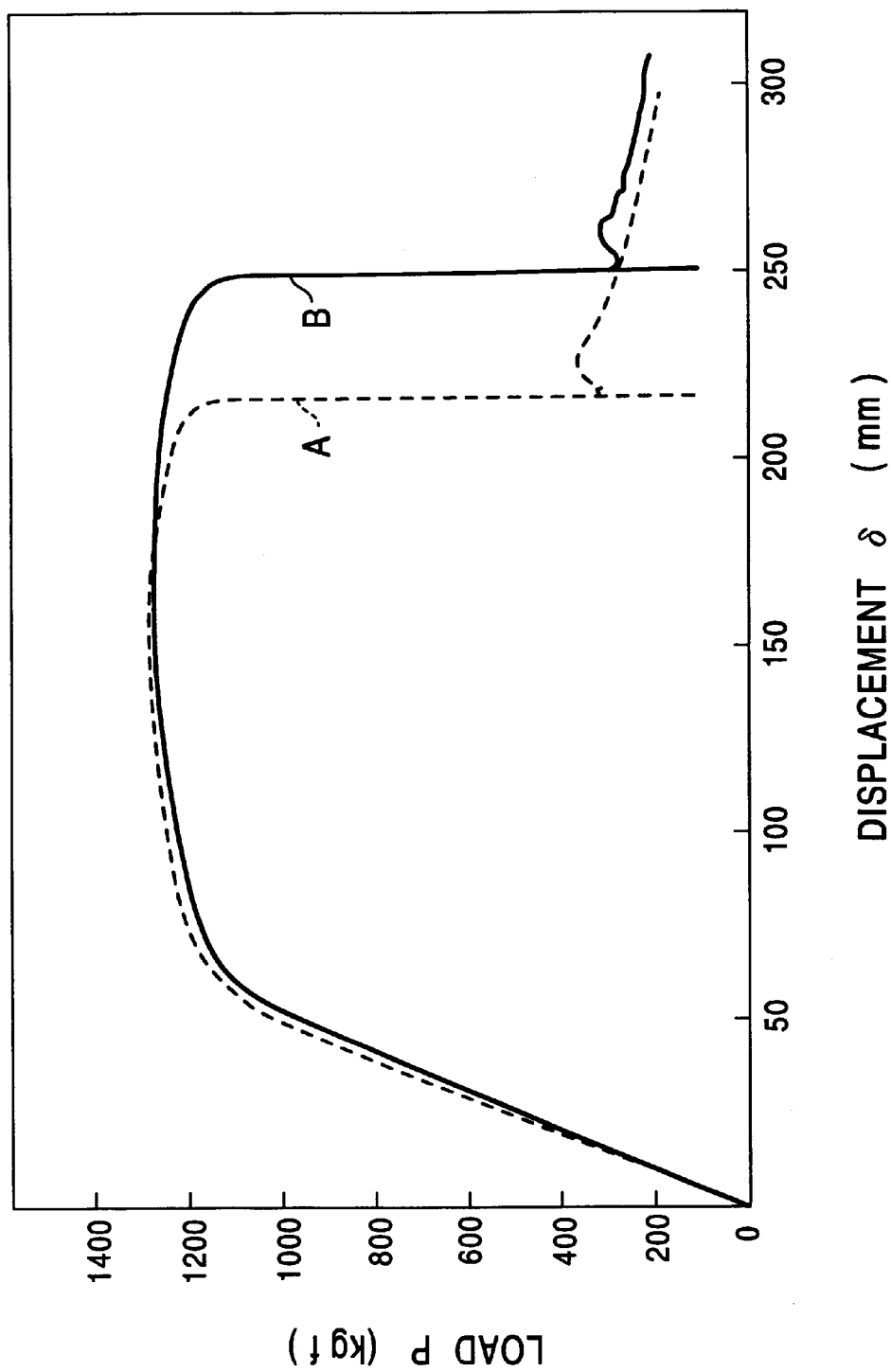
FIG. 7 is a graph including load (P) vs. displacement (δ) curves of the door beams A and B in the three-point bending test.

A cut piece was prepared from each of the door beams A and B, and subjected to the three-point bending test shown in FIG. 2A at a bending span L of 1,200 mm. A load was applied before the displacement (δ) reached 350 mm. FIG. 7 is a load (P) vs. displacement (δ) curve in the three-point bending test.

As shown in Table 1, the door beam B having an $R_{FO}$ in accordance with the present invention shows a similar maximum load, a buckling displacement higher by 17%, and an energy absorption higher by 10% regardless of a slightly smaller unit weight compared to those of the door beam A for comparison having an $R_{FO}$ out of the scope of the present invention. Such advantages can also be achieved with JIS 7N01, 6061, 6063 and 6N01 alloys, and Alloys 6000 and 7000 series in a list published by Aluminum Association, such as Alloy 6082. 7000 series alloys containing 0.8% to 1.5% of Mg and 4% to 7% of Zn, by weight respectively, are preferred in view of strength and extrudability, as described below in detail.

Second Embodiment

Figure 8C:
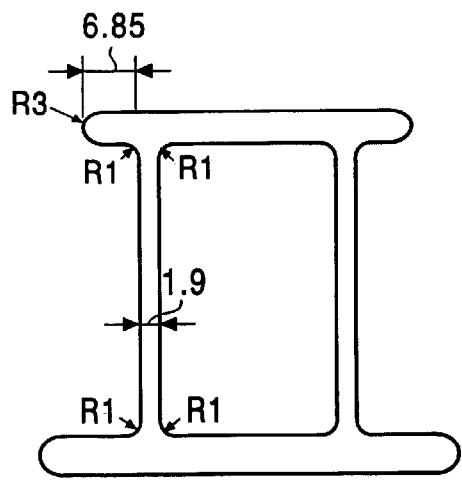
FIGS. 8C, 8D and 8E are cross-sectional views of door beams C, D and E, respectively, in a Second Embodiment.
Figure 8D:
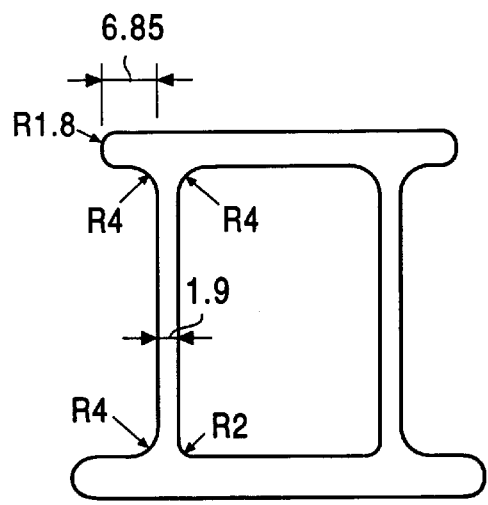
Figure 8E:
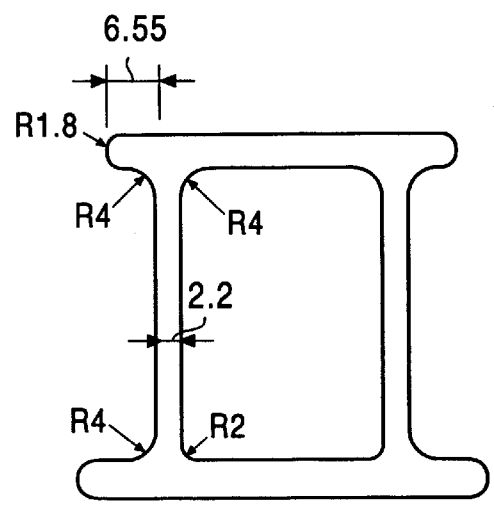

Aluminum door beams C, D and E having the cross-sections shown in FIGS. 8C, 8D and 8E, respectively, were formed using the Al—Mg—Zn alloy having the same composition as the First Embodiment. The details of the cross-sections of these door beams C, D and E are shown in Table 2. The lengths and the thicknesses of the outer flange and the inner flange, the length of the webs, and the distance between the webs are the same in the door beams C, D and E.

TABLE 2

| Door beam | $R_{WO}$ (mm) | $R_{WO}/t_W$ | $L_F/R_{WO}$ | $R_{FO}$ (mm) |
|---|---|---|---|---|
| C (For comparison) | 1 | 0.53 | 6.85 | 3 |
| D (Example) | 4* | 2.11 | 1.71* | 1.8* |
| E (Example) | 4* | 1.82* | 1.64* | 1.8* |

Figure 9:
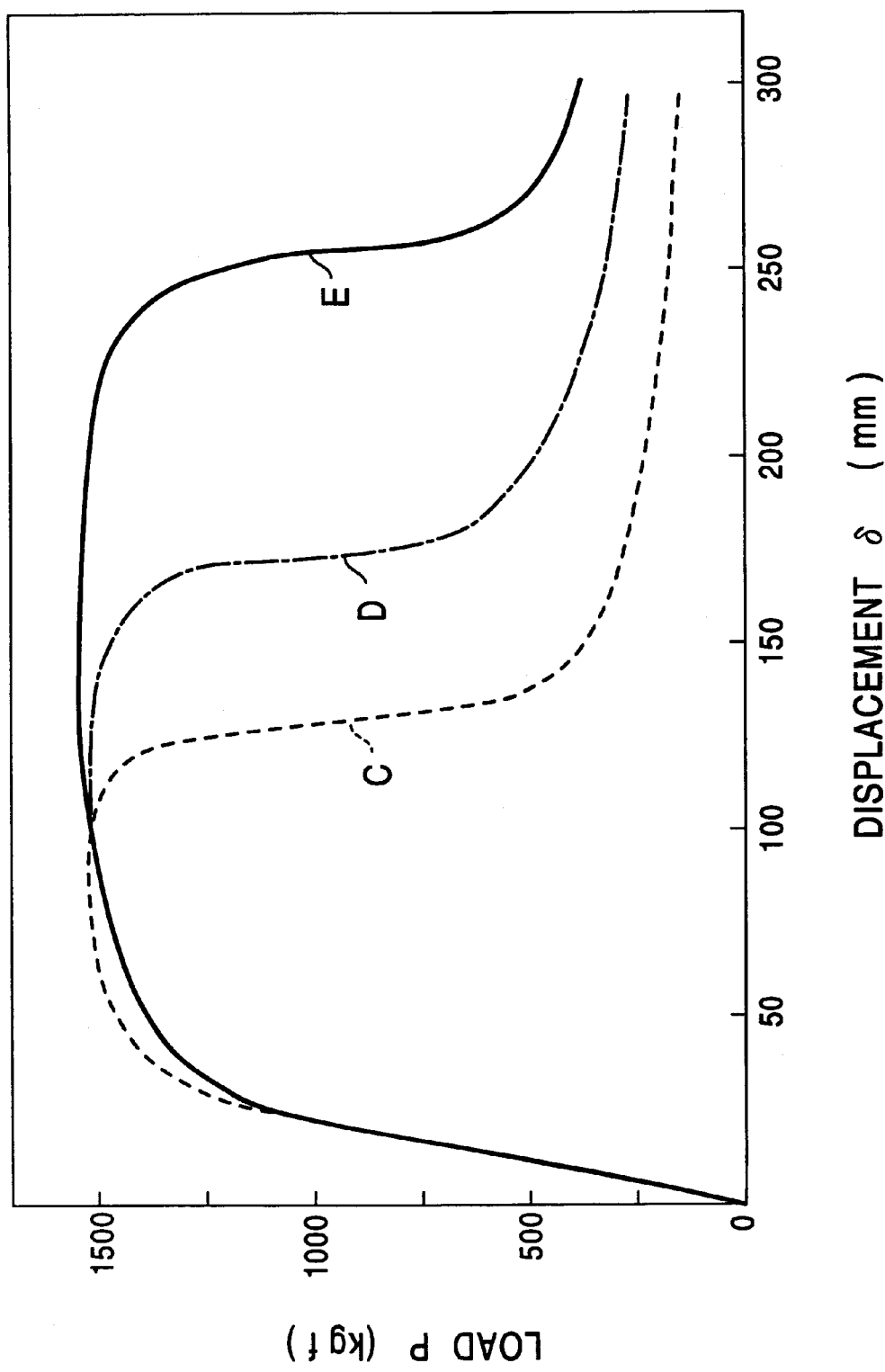
FIG. 9 is a graph including load (P) vs. displacement (δ) curves of the door beams C, D and E in the three-point bending test.

Remarks:
Asterisk* indicates that it is within the scope of the present invention.
$R_{WO}$: Curvature radius of the outward corners of the connections between the outer flange and the webs
$t_W$: Web width
$L_F$: Length of the extended ends of the outer flange
$R_{FO}$: Curvature radius of the outer corners of the outer flange A cut piece was prepared from each of the door beams C, D and E, and subjected to the three-point bending test shown in FIG. 2A at a bending span L of 950 mm. A load was applied before the displacement (δ) reached 300 mm. FIG. 9 is a load (P) vs. displacement (δ) curve in the three-point bending test. Table 3 shows the ratios of the energy absorption and the unit weight of the door beam.

TABLE 3

| Door Beam | Weight ratio | Ratio of absorption energy |
| --- | --- | --- |
| C (For comparison) | 1.00 | 1.00 |
| D (Example) | 1.05 | 1.29 |
| E (Example) | 1.09 | 1.73 |

As shown in Table 3, the door beam D in accordance with the present invention, which satisfies the $R_{WO}$, $L_F/R_{WO}$ and $R_{FO}$ ratios, shows an increase by 29% in energy absorption to the door beam C for comparison, regardless of a slight increase by 5% in weight to the door beam C. The door beam E in accordance with the present invention, which also satisfies the $R_{WO}/t_W$ ratio, as well as the $R_{WO}$, $L_F/R_{WO}$ and $R_{FO}$ ratios, shows a significant increase by 73% in energy absorption to the door beam C for comparison, regardless of a slight increase by 9% in weight to the door beam C.

In the configurations in Second Embodiment, such advantages can also be achieved with JIS 7N01, 6061, 6063 and 6N01 alloys, and Alloys 6000 and 7000 series registered in a list published by Aluminum Association, such as Alloy 6082. Open-type 7000 series alloys containing 0.8% to 1.5% by weight of Mg and 4% to 7% by weight of Zn are preferred in view of strength and extrudability, as described below in detail.

As described above, there are the following four design requirements for aluminum door beams:

(A) An $R_{FO}$ of 2.5 mm or less.

(B) An $R_{WO}$ ranging from 2 mm to 4 mm.

(C) An $R_{WO}/t_W$ ratio ranging from 1.5 to 2.

(D) An $L_F/R_{WO}$ ratio ranging from 1 to 2.

Any combination of these requirements causes further improvement in the buckling displacement and energy absorption. Preferred combinations of the requirements include (A) and (B); (A) and (C); (A) and (D); (B) and (C); (B) and (D); (C) and (D); (A), (B) and (C); (A), (B) and (D); (A), (C) and (D); (B), (C) and (D); and (A), (B), (C) and (D).

The curvature $R_{FI}$ of the inner corners at the extended ends of the outer flange $F_O$ affects the mechanical properties compared less than that of the $R_{FO}$ of the outer corner, and it is not necessary that both are equal to each other; however, it is preferable that the $R_{FI}$ be 2.5 mm or less, more preferably 2 mm or less, and most preferably 1 mm or less, as in the $R_{FO}$.

The curvature of the corners at the extended ends of the inner flange $F_I$ can be determined without restriction based on the practical design of the door beam. For example, when the extended ends of the inner flange $F_I$ are used for attaching the door beam to the vehicle door and a flat surface is required, it is preferable that the corner has a smaller curvature. On the contrary, it is preferable that the curvature be larger in view of extrudability and surface characteristics.

Although the curvature of the inward corners (at the hollow section in FIG. 1) of the connections between the webs and the inner and outer flanges is not limited, it is preferable that the curvature ranges from 2 mm to 4 mm and that it be 1.5 to 2 times the web width.

An inner flange $F_I$ longer than the outer flange $F_O$ or an extended end of the inner flange $F_I$ longer than the extended end of the outer flange $F_O$ causes a shift of the neutral axis towards the inner side (passenger side) of the vehicle. Such a shift causes increased energy absorption and delayed rupture of the door beam at the inner side by a collision load.

In the present invention, the door beam comprises an outer flange which lies in the outer side of the vehicle and is loaded with an impact load in the vertical direction, an inner flange which lies substantially parallel to the outer flange and lies in the passenger side, and at least one web connecting these flanges, and the inner flange or the outer flange preferably has a cross-section having extended ends which extend from the connecting section with the web.

In the present invention, another flange may be provided between the inner flange and the outer flange.

Third Embodiment

An aluminum alloy of Composition 1 shown in Table 4 was melted by a conventional process and cast to form an ingot with a diameter of 200 mm. The ingot was subjected to homogenizing heat treatment at 470° C. for 8 hours and then extrusion at a temperature of 470° C., an extrusion rate of 4 m/min and an extrusion ratio of 42 to form two door beams F having a cross-section shown in FIG. 10A. The extruded door beams F were immediately cooled by blowing liquid nitrogen and cooled nitrogen gas and subjected to artificial aging at 130° C. for 12 hours.

Figure 10A:
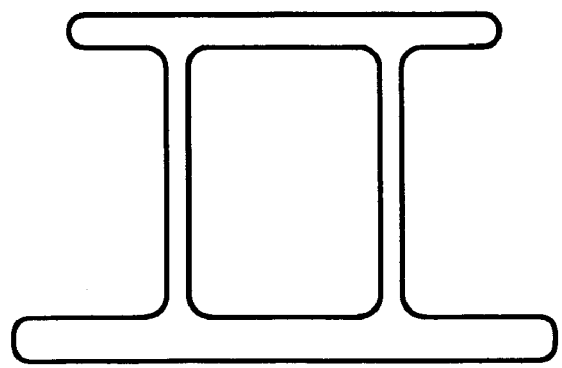
FIG. 10A is a cross-sectional view of door beam F in a Third Embodiment.

The same aluminum alloy ingot was subjected to homogenizing heat treatment at 470° C. for 8 hours and then extrusion at a temperature of 500° C., an extrusion rate of 12 m/min and an extrusion ratio of 83 to form a door beam G having the same cross-section shown in FIG. 10A. The extruded door beam G was subjected to artificial aging at 130° C. for 12 hours without cooling by liquid nitrogen and cooled nitrogen gas.

TABLE 4

| | Chemical component (wt %) | | | | | | |
| --- | --- | --- | --- | --- | --- | --- | --- |
| Compound | Mg | Zn | Ti | Cu | Mn | Cr | Zn |
| 1 | 1.3 | 6.7 | 0.03 | 0.2 | 0.2 | 0.06 | 0.14 |
| 2 | 0.72 | 5.5 | 0.04 | 0.07 | 0.02 | 0.02 | 0.18 |

Table 5 shows the results of the thickness of the recrystallization surface layer, the aspect ratio of the fibrous texture, and the three-point bending test at a bending distance of 950 mm of the door beams F and G. As shown in Table 5, the door beams F, which were within the scope of the present invention in terms of the thickness of the recrystallization surface layer and the aspect ratio of the fibrous texture, had a larger rupture displacement compared with that of the door beam G having a larger thickness and a lower aspect ratio.

TABLE 5

| Door beam | Compound | Thickness of recrystallization surface layer (μm) | Aspect ratio of fibrous texture | Maximum bending load (Kgf) | Rupture displacement (mm) | Judgement |
|---|---|---|---|---|---|---|
| G (For Comparison) | 1 | 250 | 1:2 | 1,000 | 180 | No good |
| F (Example) | 1 | 20 | 1:25 | 1,020 | 300 | Good |

Fourth Embodiment

Figure 10B:
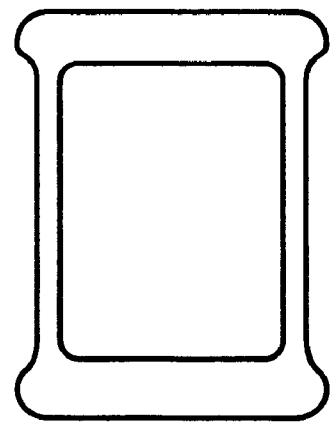
FIG. 10B is a cross-sectional view of door beams H and I in a Fourth Embodiment.

An aluminum alloy of Composition 1 shown in Table 4 was melted by a conventional process and cast to form an ingot with a diameter of 200 mm. The ingot was subjected to homogenizing heat treatment at 470° C. for 8 hours and then extrusion at a temperature of 460° C., an extrusion rate of 5 m/min and an extrusion ratio of 35 to form two door beams H having a cross-section shown in FIG. 10B. The extruded door beams H were immediately cooled by blowing liquid nitrogen and cooled nitrogen gas and subjected to aging at 130° C. for 12 hours.

A door beam I for comparison having the same cross-section was prepared from the aluminum alloy of Compound 2 shown in Table 4 by the same process.

Table 6 shows the results of the thickness of the recrystallization surface layer, the aspect ratio of the fibrous texture, and the three-point bending test at a bending distance of 700 mm of the door beams I and H. As shown in Table 6, although both door beams I and H satisfy the scope of the present invention in terms of the thickness of the recrystallization surface layer and the aspect ratio of the fibrous texture, the door beam I, which is out of the scope of the present invention in terms of the composition has a smaller maximum bending load and a smaller energy absorption compared with the door beam H.

The composition and the texture of the door beam in accordance with the present invention will now be described in more detail.

Mg and Zn

Magnesium and zinc are essential for the aluminum alloy in accordance with the present invention in order to achieve excellent mechanical properties. At a magnesium content of less than 0.8% by weight or a zinc content of less than 4% by weight, the aluminum alloy does not have the desired strength. At a magnesium content of more than 1.5% by weight or a zinc content of more than 7% by weight, the extrudability and elongation of the aluminum alloy decrease, and the required strength is not achieved. Thus, in the aluminum alloy in accordance with the present invention, the magnesium content is set to a range from 0.8 to 1.5% by weight and the zinc content is set to a range from 4 to 7% by weight.

Ti

Titanium is an essential element to form a fine texture in the ingot. A titanium content of less than 0.005% by weight does not cause satisfactory formation of the fine texture, whereas a titanium content of more than 0.3% by weight causes the formation of huge nuclei because of saturation of titanium in the aluminum alloy. Thus, the titanium content is set to a range from 0.005 to 0.3% by weight.

Cu, Mn, Cr and Zr

These elements cause increased strength of the aluminum alloy. Further, copper improves stress corrosion crack resistance of the aluminum alloy. Manganese, chromium or zirconium forms a fibrous texture to reinforce the alloy. At least one of these elements is added according to demand. Preferred ranges for these elements are as follows: 0.05 to 0.6% by weight for Cu, 0.2 to 0.7% by weight for Mn, 0.05 to 0.2% by weight for Cr, and 0.05 to 0.25% by weight for Zr. If these elements are added in an amount of less than their lower limits, these elements will not effectively contribute to the strength of the aluminum alloy. If a content of one of the elements is higher than its upper limit, the extrudability will deteriorate. In particular, copper over the upper limit will cause deterioration of general corrosion resistance.

Incidental Impurities

The aluminum alloy contains iron as the main component of the incidental impurities in a relatively large amount. If the aluminum alloy contains more than 0.35% by weight of iron, coarse intermetallic crystals form in the casting process, mechanical strength of the alloy decreases. Thus, the iron content is controlled to be 0.35% by weight or less.

Various impurities, derived from the ground metal and the mediate alloy for the essential elements, are included in the aluminum alloy. Types of the impurities vary with the used ground metal and the used mediate alloy. When the sole content of each impurity other than iron is less than 0.05% by weight and the total content of individual impurities other than iron is less than 0.15% by weight, the aluminum alloy has the desired mechanical properties. Thus, the sole content and the total content of the impurity are set to 0.05% or less and 0.15%, respectively, by weight.

Texture in Extruded Material

When a thick recrystallization layer is formed on the surface of the door beam, a rough surface forms in the

TABLE 6

| Door beam | Compound | Thickness of recrystallization surface layer (μm) | Aspect ratio of fibrous texture | Maximum bending load (Kgf) | Energy absorption (kgf · mm) | Judgement |
|---|---|---|---|---|---|---|
| I (For Comparison) | 2 | 30 | 1:20 | 1,310 | 183,300 | No good |
| H (Example) | 1 | 20 | 1:20 | 1,840 | 265,100 | Good | bending deformation process. The rough surface functions as a notch and causes stress concentration. Thus, the rupture of the door beam will be prompted, and energy absorption is decreased. Since the aluminum alloy in accordance with the present invention has a thin recrystallization layer of 50 μm or less, no rough surface forms and stress concentration is avoidable. Preferably, the recrystallization layer is not present.

It is preferable that the crystallites in the fibrous texture on the surface and inside the alloy have an aspect ratio of 1:20 or more. Although granular crystallites or low-aspect-ratio crystallites will readily form a rough surface by bending deformation, crystallites having such a high aspect ratio do not form a rough surface under a bending deformation condition for the door beam. Thus, stress concentration is avoided.

The aspect ratio of the fibrous texture in the present invention is defined as the ratio of the crystal grain size in the extruding direction to the crystal grain size in a direction in which the smallest crystal grain size is observed, in the plane perpendicular to the extruding direction, and is determined by a cutting method according to JIS-H0501. That is, a cut sample was prepared from the center of the loaded section in the inner flange subjected to the three-point bending test as shown in FIG. 2(A).

The recrystallization layer on the surface of the extruded member is formed by the heat, which is generated by large deformation of the surface in the extrusion process. Thus, the formation and propagation of the recrystallization layer can be prevented by decreasing the extrusion temperature, the extrusion speed, and the extrusion ratio by means of multinozzle extrusion. Further, the formation and propagation of the recrystallization layer can be prevented by rapidly cooling only the surface layer of the extruded member near downstream of the outlet of the extrusion die.

Exemplary conditions for producing the aluminum door beam having the above-mentioned texture are as follows: a homogenizing heat treatment temperature of 450° C. to 500° C., an extruding temperature of 400° C. to 500° C., an extruding rate of 6 to 10 m/min., an extrusion rate of 35 to 70, an aging temperature of 130° C. to 170° C., and an aging time of 6 to 12 hours. The temperature rise on the surface of the extruded member is suppressed by liquid nitrogen and cooled nitrogen gas blow near the outlet of the extrusion die.

The cross-section, the composition and the texture in accordance with the present invention is described above. Buckling displacement, energy absorption and a displacement without rupture can be further improved by combining these parameters.

What is claimed is:

1. An aluminum alloy extruded door beam material comprising an outer flange, an inner flange, and at least one web for connecting the outer flange and the inner flange, wherein the outer flange contains extended ends that extends in a length beyond the web, said extended ends having outer corners with a radius; wherein the web and the inner flange, and the web and the outer flange, each form extended connections having outward corners with a radius; and wherein said door beam material has at least one characteristic selected from the group consisting of the following characteristics (1) to (3);

(1) the outward corners at the extended connections between the web and the inner flange and between the web and the outer flange having a radius R of 2 mm to 4 mm, (2) the radius of the outward corners at the connections between the web and the inner flange and between the web and the outer flange being 1.5 to 2 times the width of the web, and (3) the length of the extended ends of the outer flange being to 1 to 2 times the radius R of the outward corner at the connections between the web and the outer and inner flange.

2. An aluminum alloy extruded door beam material according to claim 1, wherein the aluminum alloy comprises in % by weight 0.8 to 1.5% of Mg and 4 to 7% of Zn.

3. An aluminum alloy extruded door beam material according to claim 1, wherein the aluminum alloy comprises in % by weight 0.8 to 1.5% of Mg; 4 to 7% of Zn; 0.005 to 0.3% of Ti; at least one element selected from the group consisting of 0.05 to 0.6% of Cu, 0.2 to 0.7% of Mn, 0.05 to 0.3% of Cr, and 0.05 to 0.25 of Zr; and the balance being Al and incidental impurities.

4. An aluminum alloy extruded door beam material according to claim 1, wherein the aluminum alloy comprises in % by weight 0.8 to 1.5% of Mg and 4 to 7% of Zn, and the aluminum alloy has a recrystallization surface layer having a thickness of 50 μm or less.

5. An aluminum alloy extruded door beam material according to claim 4, wherein a fibrous texture is present below the recrystallization surface layer.

6. An aluminum alloy extruded door beam material according to claim 5, wherein the fibrous texture has an aspect ratio of 1:20 or more.

7. An aluminum alloy extruded door beam material according to claim 1, wherein the aluminum alloy comprises in % by weight 0.8 to 1.5% of Mg; 4 to 7% of Zn; 0.005 to 0.3% of Ti; at least one element selected from the group consisting of 0.05 to 0.6% of Cu, 0.2 to 0.7% of Mn, 0.05 to 0.3% of Cr, and 0.05 to 0.25% of Zr; and the balance being Al and incidental impurities, and the aluminum alloy has a recrystallization surface layer having a thickness of 50 μm or less.

8. An aluminum alloy extruded door beam material according to claim 7, wherein a fibrous texture is present below the recrystallization surface layer.

9. An aluminum alloy extruded door beam material according to claim 8, wherein the fibrous texture has an aspect ratio of 1:20 or more.

10. An aluminum alloy extruded door beam material according to claim 2, wherein a fibrous texture is present on the surface of the aluminum alloy extruded door beam material.

11. An aluminum alloy extruded door beam material according to claim 10, wherein the fibrous texture has an aspect ratio of 1:20 or more.

12. An aluminum alloy extruded door beam material according to claim 3, wherein a fibrous texture is present on the surface of the aluminum alloy extruded door beam material.

13. An aluminum alloy extruded door beam material according to claim 12, wherein the fibrous texture has an aspect ratio of 1:20 or more.

14. An aluminum alloy extruded door beam material according to claim 1, wherein the inner flange or the outer flange has a cross-section having extended ends which extend from the connecting section with the web.

15. An aluminum alloy extruded door beam material comprising 0.8 to 1.5% by weight (hereinafter the same) of Mg and 4 to 7% of Zn, and the aluminum alloy has a recrystallization surface layer having a thickness of 50 μm or less, wherein a fibrous texture is present below the recrystallization surface layer, wherein the fibrous texture has an aspect ratio of 1:20 or more.

16. An aluminum alloy extruded door beam material comprising 0.8 to 1.5% by weight (hereinafter the same) of Mg; 4 to 7% of Zn; 0.005 to 0.3% of Ti; at least one element selected from the group consisting of 0.05 to 0.6% of Cu, 0.2 to 0.7% of Mn, 0.05 to 0.3% of Cr, and 0.05 to 0.25% of Zr; and the balance being Al and incidental impurities, wherein the aluminum alloy has a recrystallization surface layer having a thickness of 50 μm or less, wherein a fibrous texture is present below the recrystallization surface layer, wherein the fibrous texture has an aspect ratio of 1:20 or more.

17. The aluminum alloy extruded door beam material according to claim 1, having characteristic (1).

18. The aluminum alloy extruded door beam material according to claim 1, having characteristic (2).

19. The aluminum alloy extruded door beam material according to claim 1, having characteristic (3).

20. The aluminum alloy extruded door beam material according to claim 1, having characteristics (1) and (2).

21. The aluminum alloy extruded door beam material according to claim 1, having characteristics (1) and (3).

22. The aluminum alloy extruded door beam material according to claim 1, having characteristic (1), and wherein the outer corners at the extended ends of the outer flange having a radius R of 2.5 mm or less.

23. The aluminum alloy extruded door beam material according to claim 1, having characteristics (2) and (3).

24. The aluminum alloy extruded door beam material according to claim 1, having characteristic (2), and wherein the outer corners at the extended ends of the outer flange having a radius R of 2.5 mm or less.

25. The aluminum alloy extruded door beam material according to claim 1, having characteristic (3), and wherein the outer corners at the extended ends of the outer flange having a radius R of 2.5 mm or less.

26. The aluminum alloy extruded door beam material according to claim 1, having characteristics (1), (2) and (3).

27. The aluminum alloy extruded door beam material according to claim 1, having characteristics (1) and (2), and wherein the outer corners at the extended ends of the outer flange having a radius R of 2.5 mm or less.

28. The aluminum alloy extruded door beam material according to claim 1, having characteristics (1) and (3), and wherein the outer corners at the extended ends of the outer flange having a radius R of 2.5 mm or less.

29. The aluminum alloy extruded door beam material according to claim 1, having characteristics (2) and (3), and wherein the outer corners at the extended ends of the outer flange having a radius R of 2.5 mm or less.

30. The aluminum alloy extruded door beam material according to claim 1, having characteristics (1), (2), and (3), and wherein the outer corners at the extended ends of the outer flange having a radius R of 2.5 mm or less.

* * * * *